US005471608A

United States Patent [19]

Lee et al.

[11] Patent Number: 5,471,608

[45] Date of Patent: Nov. 28, 1995

[54] DYNAMICALLY PROGRAMMABLE TIMER-COUNTER HAVING ENABLE MODE FOR TIMER DATA LOAD AND MONITORING CIRCUIT TO ALLOW ENABLE MODE ONLY UPON TIME-OUT

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 137,460

[22] Filed: Dec. 9, 1993

[51] Int. Cl.[6] .................. G06F 9/18

[52] U.S. Cl. .................. 395/550; 364/DIG. 1; 364/270; 364/270.1; 364/270.3

[58] Field of Search .................. 364/270, 270.1, 364/270.3; 395/550

[56] References Cited

U.S. PATENT DOCUMENTS

| | | | |
|---|---|---|---|
| 4,090,239 | 5/1978 | Twibell et al. | 364/DIG. 1 |
| 4,395,756 | 7/1983 | Daniels | 364/200 |
| 4,461,787 | 7/1979 | Groves et al. | 364/DIG. 2 |
| 4,638,452 | 1/1987 | Schultz et al. | 395/550 |
| 4,644,498 | 2/1987 | Bedard et al. | 364/900 |
| 4,695,942 | 9/1987 | Levrue et al. | 364/188 |
| 4,816,823 | 3/1989 | Polkinghorne et al. | 340/825.15 |
| 4,873,624 | 10/1989 | Sibigtroth | 364/DIG. 1 |
| 4,893,271 | 1/1990 | Davis et al. | 395/550 |
| 4,931,986 | 6/1990 | Daniel et al. | 395/550 |
| 4,984,241 | 1/1991 | Truong | 371/36 |
| 5,081,297 | 1/1992 | Lebel et al. | 395/325 |
| 5,155,841 | 10/1992 | Bumbarger | 395/550 |
| 5,204,957 | 4/1993 | Wilkie et al. | 395/800 |
| 5,218,704 | 6/1993 | Watts, Jr. et al. | 395/750 |
| 5,325,341 | 6/1994 | Viot et al. | 368/113 |

*Primary Examiner*—Kevin A. Kriess
*Assistant Examiner*—Jonathan Hall Backenstose
*Attorney, Agent, or Firm*—Charles G. Parks, Jr.; Melvin J. Scolnick

[57] ABSTRACT

A programmable timer circuit is comprised of a programmable timer counter for receiving a count and for counting to the count. A clock signal for driving the timer counter which timer counter generates a signal representative of the count. A microprocessor generates count data in response to programming of the microprocessor. Timer data register receive the count from microprocessor. A first gate is provided having an enabled mode and an non-enabled mode for enabling loading of the timer data from the timer data register to the timer counter input only in the enabled mode. A monitoring circuit is provided for monitoring the timer count and enabling the gate mean to the enabled mode only when the timer has time-out.

8 Claims, 5 Drawing Sheets

DYNAMICALLY PROGRAMMABLE TIMER-COUNTER HAVING ENABLE MODE FOR TIMER DATA LOAD AND MONITORING CIRCUIT TO ALLOW ENABLE MODE ONLY UPON TIME-OUT

RELATED APPLICATIONS

The following co-pending applications are commonly assigned to Pitney Bowes Inc., filed concurrently on Dec. 9, 1993, U.S. patent application Ser. No. 08/163,627, entitled MULTIPLE PULSE WIDTH MODULATION CIRCUIT; U.S. patent application Ser. No. 08/165,134, entitled DUAL MODE TIMER-COUNTER; U.S. Pat. No. 5,377,264 issued on Dec. 27, 1994, entitled MEMORY ACCESS PROTECTION CIRCUIT WITH ENCRYPTION KEY; U.S. patent application Ser. No. 08/163,811, entitled MEMORY MONITORING CIRCUIT FOR DETECTING UNAUTHORIZED MEMORY ACCESS; U.S. patent application Ser. No. 08/163,771, entitled MULTI-MEMORY ACCESS LIMITING CIRCUIT FOR A MULTI-MEMORY DEVICE; U.S. patent application Ser. No. 08/163,790, entitled ADDRESS DECODER WITH MEMORY ALLOCATION FOR A MICRO-CONTROLLER SYSTEM; U.S. patent application Ser. No. 08/163,810, entitled INTERRUPT CONTROLLER FOR AN INTEGRATED CIRCUIT; U.S. patent application Ser. No. 08/163,812, entitled ADDRESS DECODER WITH MEMORY WAIT STATE CIRCUIT; U.S. patent application Ser. No. 08/163,813, entitled ADDRESS DECODER WITH MEMORY ALLOCATION AND ILLEGAL ADDRESS DETECTION FOR A MICRO-CONTROLLER SYSTEM; U.S. patent application Ser. No. 08/164,100, entitled PROGRAMMABLE CLOCK MODULE FOR POSTAGE METERING CONTROL SYSTEM and U.S. patent application Ser. No. 08/163,629, entitled CONTROL SYSTEM FOR AN ELECTRONIC POSTAGE METER HAVING A PROGRAMMABLE APPLICATION SPECIFIC INTEGRATED CIRCUIT, unless otherwise noted, all of which patent applications are now pending.

BACKGROUND OF THE INVENTION

The present invention relates to a timer circuit, and more specifically, to a method of programming a programmable timer circuit for an integrated circuit arrangement.

It is known to use a programmable timer counter within an integrated circuit arrangement. In one such conventional circuit arrangement, a programmable microprocessor is in bus communication with an application specific integrated circuit (ASIC) It is known to comprise the ASIC of a plurality of interconnected integrated circuit modules for performing various signaling functions. One such module of the ASIC can be an address decoder and programmable timer. To program the timer, the microprocessor addresses a specific ASIC address and latches the appropriate timer data on the data bus. The ASIC responds to enable the writing of the timer data into the timer counter and then enables the timer counter to count out. Programming of the timer counter in this manner restricts waiting to the timer counter to a period within the timer has time-out.

SUMMARY OF THE INVENTION

It is an objective of the present invention to present a microprocessor control system employing a microprocessor in bus communication with a ASIC and a plurality of memory units, the ASIC having a count programmable timer module which count can be programmed independent of timer count.

It is an further objective of the present invention to present a microprocessor control system employing a microprocessor in bus communication with a ASIC and a plurality of memory units, the ASIC having a count programmable timer module which count can be programmed independent of timer count and which timer can be programmed to operate in either a continuous or one-shot mode.

The microcontroller system is comprised of a microprocessor which is in bus communication with a number of memory units and an ASIC. The ASIC includes a number of system modules, for example, a non-volatile memory security module, a printhead controller module, a pulse width modulation module, etc. One of the modules of the ASIC is a timer circuit module. The timer circuit module includes a plurality of registers which can be addressed to enable writing of timer data into the module. One of the timer registers is a timer control register and an input data register is also included. In response to data written in the timer control register, a continuous or one-shot mode is selected and, also, the timing period. The timer circuitry either enables the system clock to clock the timer single time-out in the one shot mode or sequentially re-enables the system clock to clock the timer for a uninterrupted second and subsequent time-out by retriggering. During retriggering of the timer, timer data written to the timer input registers is reloaded to the timer.

The timer data register and the timer control registers can be accessed for writing of timer data into each register by the microprocessor through an ASIC decoder circuit and data bus independently of timer count. A gate restricts loading of the timer count to the timer counter until timer count time-out is reached, at which point, a signal is produced which enables the gate to allow the timer count in the timer data register to be loaded into the timer counter. Also, a timer output register is in communication with the timer count output count which enables the timer count to be read by the microprocessor for status checking. Further, the timer data presently in the timer data register may be read by the microprocessor at any time upon enabling by the microprocessor of a second gate means.

It should be appreciated, that the programmable timer circuit offers the benefit of allowing the microprocessor to write timer data at any opportune time with concern for or disturbing the timer count. It is also beneficial for the microprocessor to be able to confirm the timer count data written to the timer data register and to monitor the timer count at any time independent of the timer count. Other advantages of the present invention should be appreciated from the following detailed description.

BRIEF DESCRIPTION OF THE DRAWINGS

FIG. **3*a* is a process flow diagram for setting of the timer in accordance with the present invention

DETAILED DESCRIPTION OF THE PREFERRED EMBODIMENT

Figure 1:
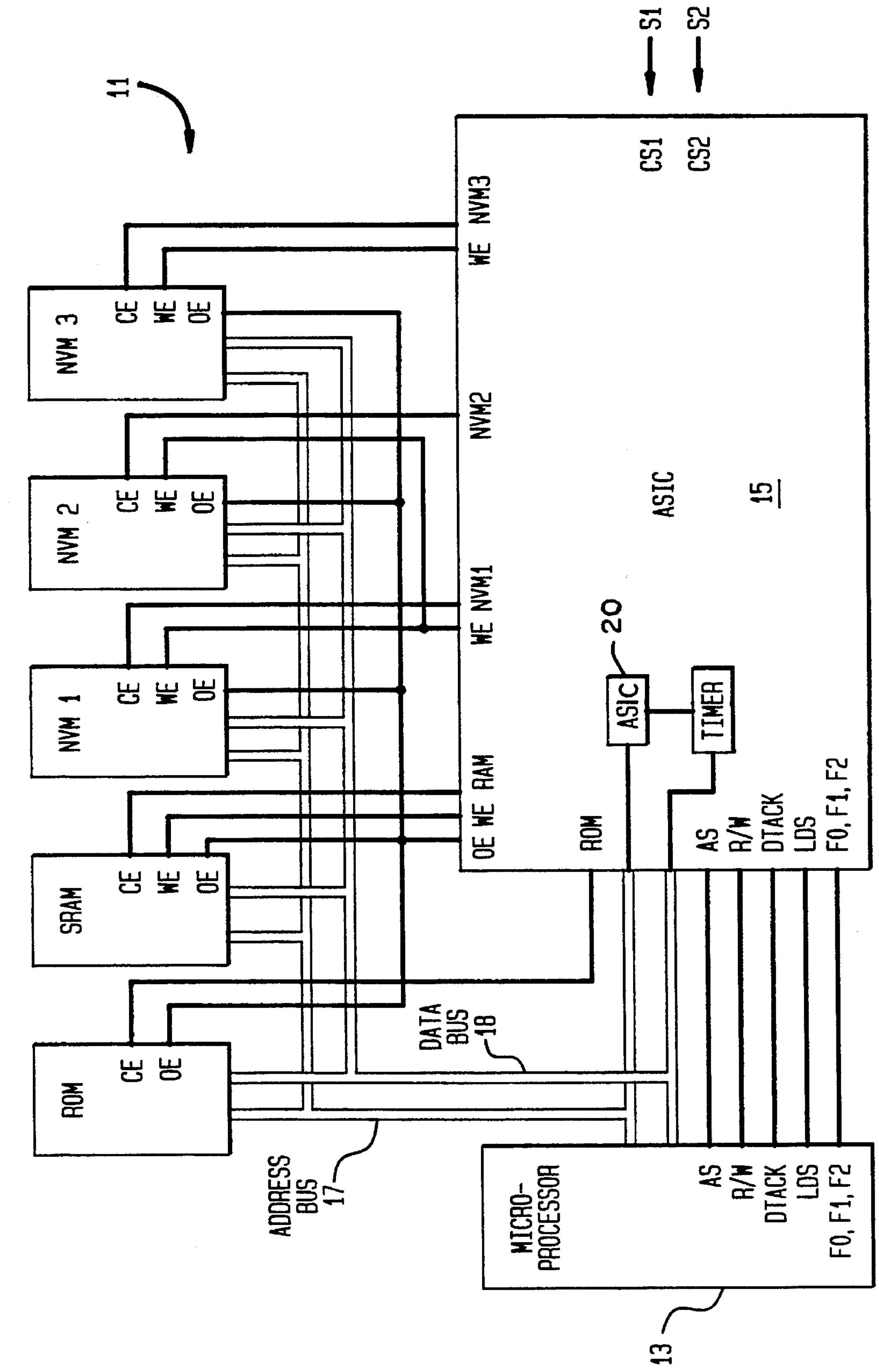
FIG. 1 is a schematic of a microprocessor control system including an ASIC in accordance with the present invention.
Figure 2:
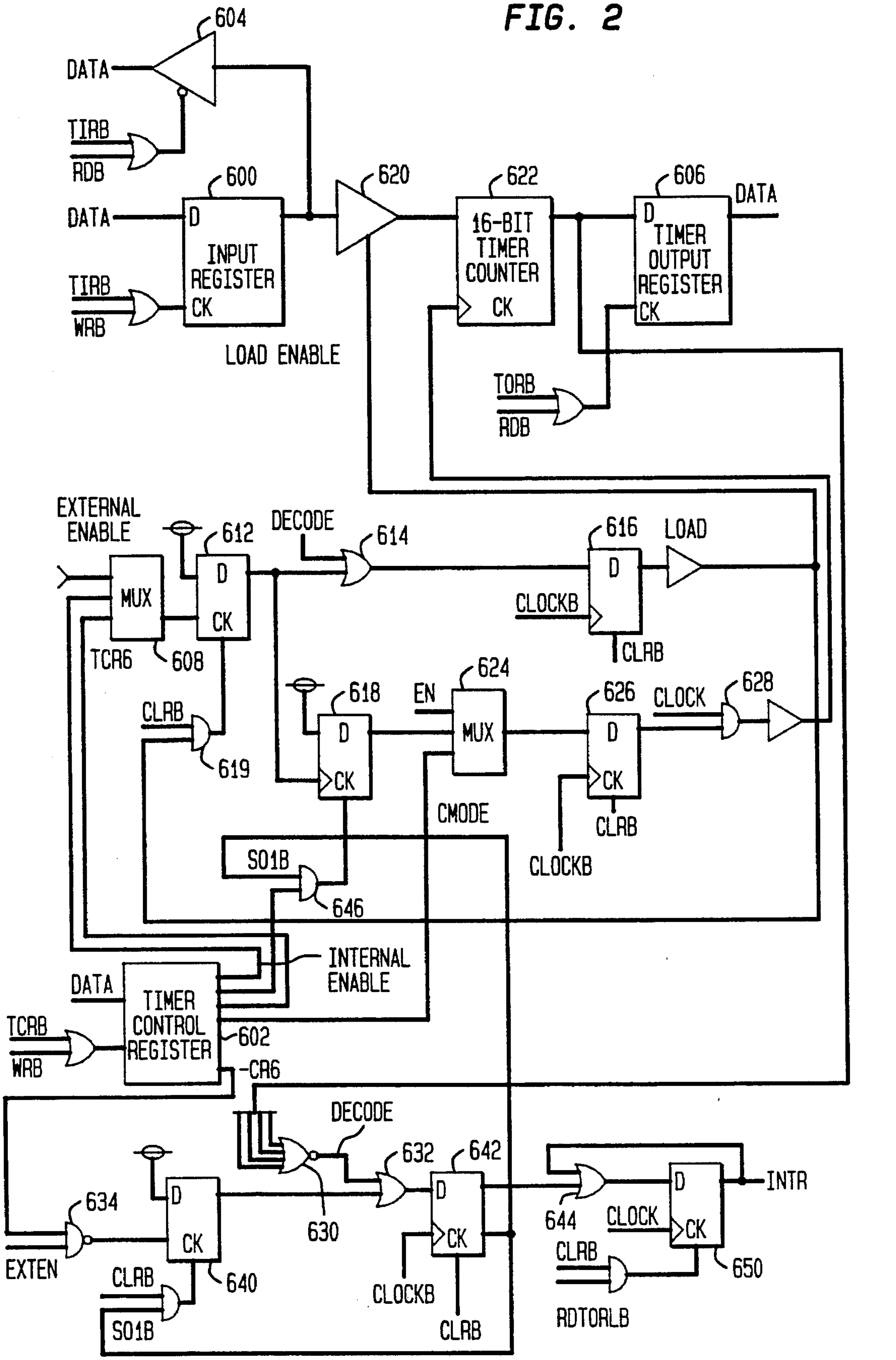
FIG. 2 is a schematic of a timer circuit in accordance with the present invention.
Figure 3A:
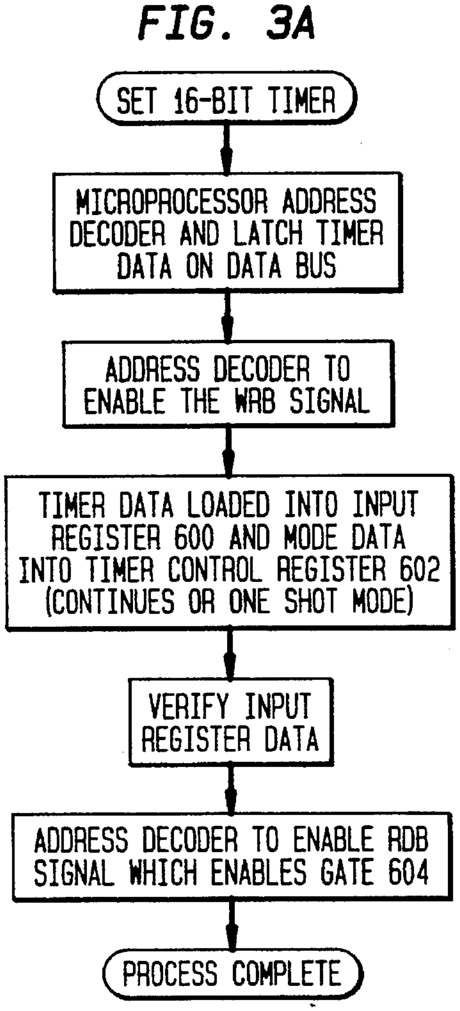
FIG. 3*b* is a process flow diagram for changing the setting of the timer in accordance with the present invention
FIG. 3*c* is a process flow diagram for reading the setting of the timer in accordance with the present invention
FIG. 3*d*** is a process flow diagram for changing the timer mode of the timer in accordance with the present invention
Figure 3B:
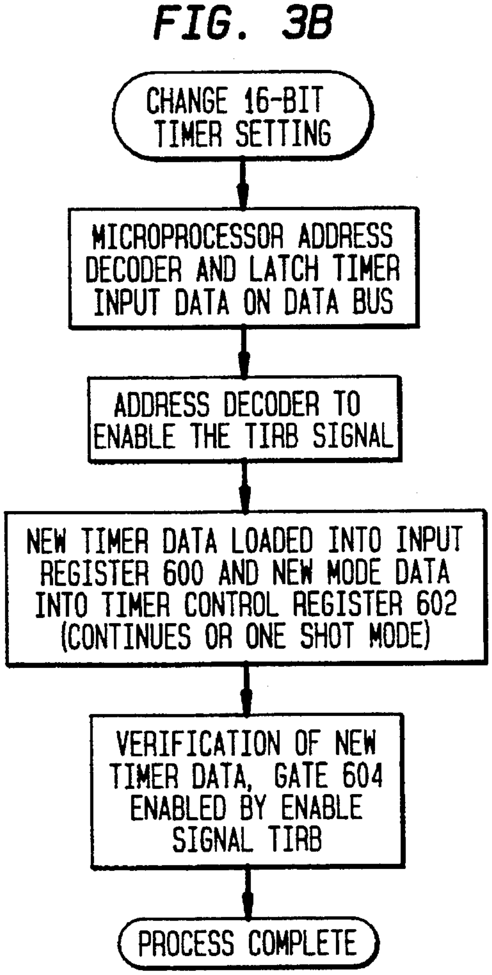
Figure 3C:
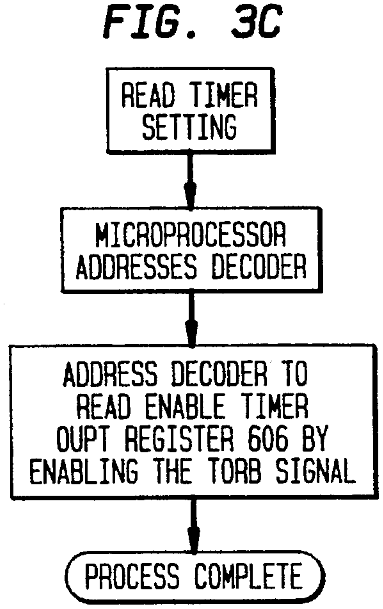
Figure 3D:
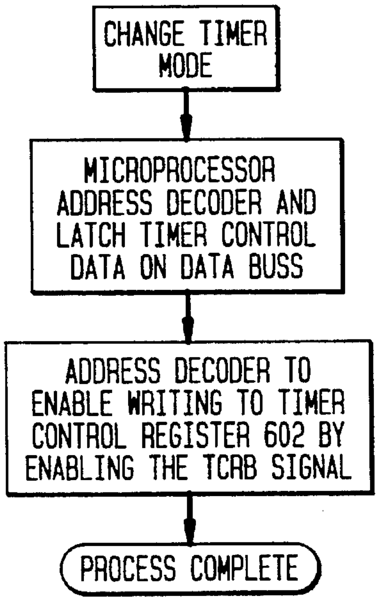
Figure 4:
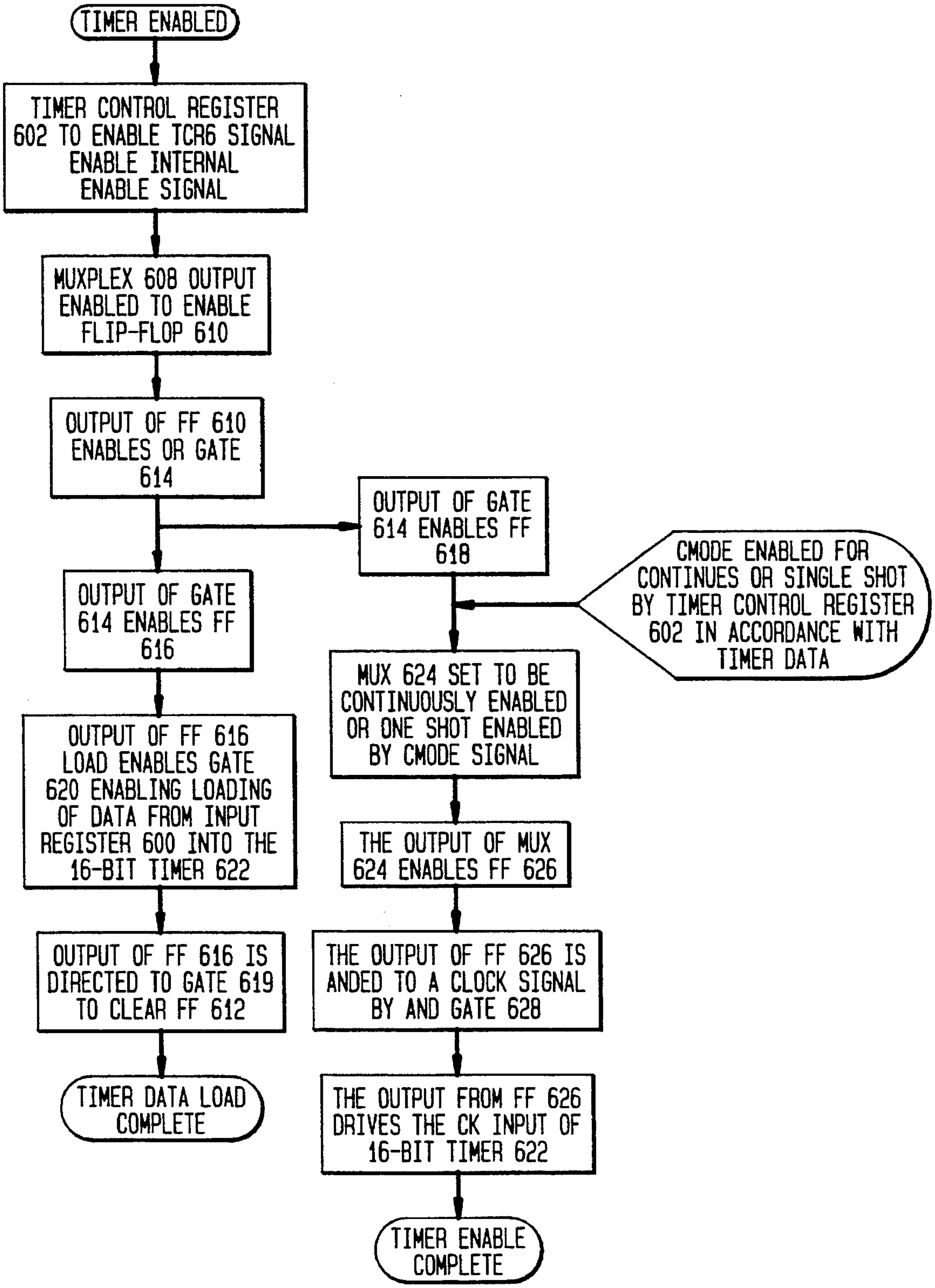
FIG. 4 is a process flow diagram of the timer enable circuit in accordance with the present invention.
Figure 5:
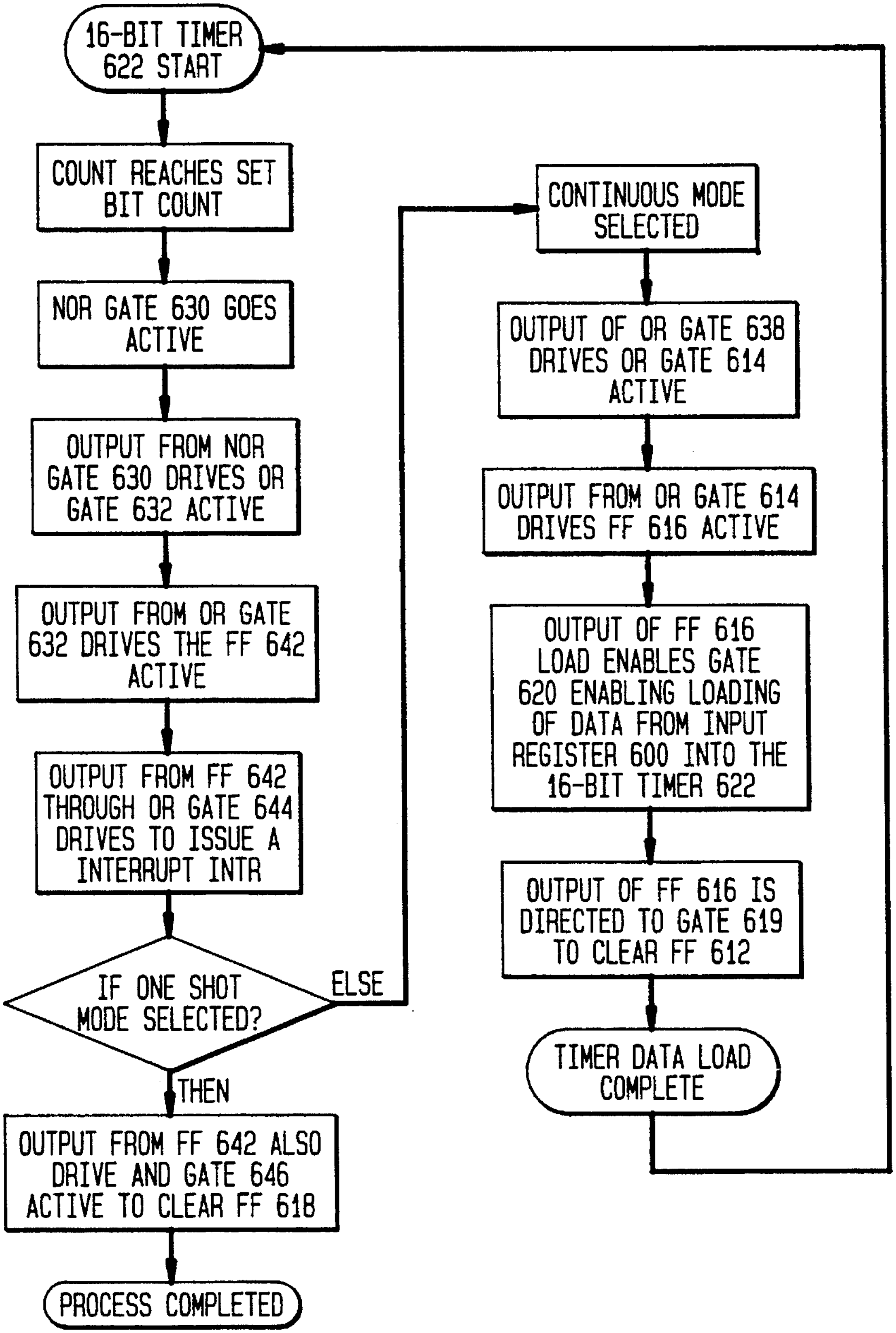
FIG. 5 is a process flow diagram for starting and re-starting the timer in accordance with the present invention.

Referring to FIG. 1, a micro-controller system, generally indicated as 11, is comprised of a microprocessor 13 in bus 17 and 18 communication with an application specific integrated circuit (ASIC) 15, a read only memory (ROM), a random access memory (RAM) and a plurality of non-volatile memories (NVM1, NVM2, NVM3). The microprocessor 13 also communicates with the ASIC 15 and memory units by way of a plurality of control line, more particularly described subsequently. It should be appreciated that, in the preferred embodiment, the ASIC 15 includes a number of circuit modules or units to perform a variety of control function related to the operation of the host device, which, in the present preferred embodiment, the host device is a postage meter mailing machine.

Referring to FIGS. 2 through 5, the timer circuit will be described in accordance with the timer process flow diagrams. In order to set the 16-bit timer, the microprocessor addresses the ASIC decoder 20 and latches the timer data on the data bus 17. The address decoder 20 then enables the write signal which then allows the timer data on the data bus 17 to be loaded into the input register 600 and mode data into the timer control register 602. The mode data is that data which enables the timer for continuous mode or a one-shot mode which will be further described later. After the data is loaded into the input register 600, the address decoder 20 then enables the RDB signal which enables gate 604, which then enables the microprocessor to read the data and compare the data such as to confirm that the proper timer data has been written to the timer input register 600.

In order to enable the timer 622, the timer control register 602 is enabled by the TCR6 signal from the timer control register 602 which enables the internal enable signal. This signal is delivered to multiplexer 608 whose output then enables the flip-flop 612. The output of flip-flop 612 enables OR gate 614 and flip-flop 618. The output of flip-flop 616 enables gate 620 which enables loading of data from the input register 600 into the 16-bit timer 622. The output of flip-flop 616 also is directed to gate 619 to clear flip-flop 612 which signals the completion of the timer data load. Referring back to the output of flip-flop 612 which enables flip-flop 618, the multiplexer 624 is set to be continuously enabled or to be one-shot enabled by the C mode signal from the timer control register 602. In the single shot mode the input of the multiplexer 624 is set to receive the output from flip-flop 618. In the continuous mode, the input of the multiplexer 624 is set to receive a continuous enable (EN). Optionally, the timer enable signal can be supplied externally to allow measuring intervals of events.

As noted, if the multiplexer 624 has been set to the one-shot mode, then the output of flip-flop 618 is the input signal to the multiplexer 624. The output of the multiplexer 624 enables flip-flop 626 which is AND to a clock signal by AND gate 628. The output from flip-flop 626, in combination with the clock signal, drives the clock input of the 16-bit timer 622. At this point, timer enable is complete and the timer is initiated for counting. When the timer 622 reaches the set bit count loading to the timer counter 622 from the input register 600, OR gate 630 goes active. When the OR gate 630 goes active, the output from the OR gate 630 drives OR gate 632 which in turns drives the flip-flop 642 active. The output from flip-flop 642, through an OR gate 644, drives flip-flop 650 to issue an interrupt to the microcontroller system to indicate that the timer has timed out. If a one-shot mode is selected, then the output from flip-flop 642 also drives an AND gate 646 which goes active to clear flip-flop 618. Once flip-flop 618 is cleared, the AND gate 628 goes inactive, thereby stopping clocking of the 16-bit timer counter 622.

If a continuous mode has been selected then the output of OR gate 630 drives OR gate 614 active. The output from OR gate 614 drives flip-flop 616 active which then actuates the gate 620 which enables reloading of data from the input register 600 into the 16-bit counter. The output from flip-flop 616 is again directed to gate 619 to clear flip-flop 612 and the timer load is complete, and the timer then starts counting again. The enable signal to the multiplexer 624 is continuous, therefore, the clock signal provided at AND gate 628 is continuously provided to clock the timer 622.

In order to change the 16-bit timer setting, it is not necessary to disturb the count. While the timer is running, the microprocessor 13 can address the decoder 20 and latches the new timer input data on the data bus. The address decoder 20 then enables the TIRB signal. When the TIRB signal goes active, the new timer data is loaded into the input register 600 and new mode data into the timer control register 602. Verification of the new timer data can be accomplished by since gate 604 is enabled by the TRIB signal which allows the data written into the input register 600 to be read by the microprocessor through gate 604.

It is also possible to read timer data from a timer output register 600 without disturbing the timer count of the timer 622. In order to read the timer setting, it is necessary that the microprocessor 13 address the address decoder 20, the address decoder 20 then read/enables the timer output register 606 by enabling the TROB signal which places the data which is in the timer register 606 on the data bus for reading by the microprocessor 13.

The timer mode can also be changed independently when the microprocessor addresses the decoder 20 and latches the timer control data on the data bus. The address decoder 20 then write/enables the timer control register 602 by enabling the TCRB signal for writing of new mode data into the timer register. It should now be appreciated that the present invention allows for the timer to be set to either programmable and selectable to be either single or continuous mode of operation.

What is claimed is:

1. A programmable timer circuit comprising: programmable timer counter means having timer counter input means for receiving count data and for receiving a periodical clock signal and counting to a count representing said count data in response to said clock signal and having an output means for generating a signal representative of said count, a programmable means for generating count data in response to programming of said programmable means, timer data register means for receiving said count from programmable means, first gate means having an enabled mode and an non-enabled mode for enabling loading of said count data from said timer data register means to said timer counter input mean only when said first gate means is in said enabled mode, monitoring means for monitoring said signal of said timer counter means and enabling said first gate means to said enabled mode only when said timer counter means has generated a time-out signal;

a second gate means having an enabled mode in response to a control signal from said programmable means for permitting said programmable means to read data written to said timer data register means without disruption of the running count of said timer counter means.

2. A programmable timer circuit comprising:

programmable timer counter means having timer counter input means for receiving count data and for receiving a periodical clock signal and counting to a count representing said count data in response to said clock signal and having an output signal means for generating a signal representative of said count, a programmable means for generating count data in response to programming of said programmable means, timer data register means for receiving said count from said programmable means, first gate means having an enabled mode and an non-enabled mode for enabling loading of said timer data from said timer data register to said timer counter input mean only in said enabled mode, monitoring means for monitoring signal of said timer counter means and enabling said first gate means to said enabled mode selection only when said timer counter means has generated a time-out a timer output register in bus communication with said output of said timer counter means for writing each count of said timer count means in said timer output register, said timer output register to be responsive to a control signal from said programmable means for permitting said programmable means to read said timer count from said output register without run count of said timer.

3. A programmable timer as claimed in claim 1 further comprising control means for selectively operating said timer in a one shot mode or in a continuous mode, wherein in said continuous mode said first gate mean is sequentially enabled after each time-out of said timer counter means for reloading of said timer count data from said timer data register means.

4. A programmable timer as claimed in claim 3 wherein said control means includes:

means for providing said clock signal to said timer counter means until said timer counter means reaches said count when said mode select signal is in said one shot mode, and for sequentially re-enabling said gate mean each time said timer counter means reaches said time-out count and continuously providing said clock signal when said mode select signal is in said continuous mode.

5. A programmable timer circuit as claimed in claim 4 wherein said timer circuit is a module of an application specific integrated circuit in bus communication with said programmable means and a plurality of memory devices for controlling the operation of a postage metering system.

6. A programmable timer circuit comprising:

programmable timer counter means, wherein said timer circuit is a module of an application specific integrated circuit in bus communication with a programmable microprocessor and a plurality of memory devices for controlling the operation of a postage metering system, said timer means having input means for receiving a count data represent a count and for receiving a periodical clock signal and counting to said count in response to said clock signal for generating a signal representative of said count, programmable timer counter means having input means for receiving a count data and for receiving a periodical clock signal and counting to a count representing said count data in response to said clock signal and for an output means generating a signal representative of said count, a programmable means for generating count data in response to programming, timer data register means for receiving said count from said programmable means, first gate means having an enabled mode and an non-enabled mode for enabling loading of said count data from said timer data register means to said timer counter input mean only when said first gate means is in said enabled mode, monitoring means for monitoring said signal of said timer counter means and enabling said first gate means to said enabled mode only when said timer counter means has generated a time-out signal;

a second gate means having an enabled mode in response to a control signal from said programmable means for permitting said programmable means to read data written to said timer data register means without disruption of the running count of said timer counter means, a timer output register in bus communication with said output of said timer counter means for writing each count of said timer count means in said timer output register, said timer output register to be responsive to a control signal from said microprocessor for permitting said microprocessor to read said count from said output register.

7. A programmable timer as claimed in claim 6 further comprising control means for operating said timer in a one shot mode or in a continuous mode, wherein in said continuous mode in response to a second control signal from said programmable means wherein said continuous mode said first gate mean is sequentially enabled after each time-out of said timer counter means for reloading of said timer count data from said timer data register means.

8. A programmable timer as claimed in claim 7 wherein said control means includes:

means for providing said clock signal to said timer counter means until said timer counter means reaches said count when said mode select signal is in said one shot mode, and for sequentially re-enabling said gate mean each time said timer counter means reaches said time-out count and continuously providing said clock signal when said mode select signal is said continuous mode.

* * * * *